United States Patent
Ljungstroem et al.

(10) Patent No.: US 7,248,886 B1
(45) Date of Patent: Jul. 24, 2007

(54) PUBLIC MOBILE COMMUNICATION SYSTEM COMPATIBLE WIRELESS COMMUNICATION SYSTEM

(75) Inventors: Patrik Ljungstroem, Bonn (DE); Walter Mohrs, Bonn (DE); Frieder Pernice, Groβ-Zimmern (DE)

(73) Assignee: Detemobil Deutsche Telekom Mobilnet GmbH, Bonn (DE)

( * ) Notice: Subject to any disclaimer, the term of this patent is extended or adjusted under 35 U.S.C. 154(b) by 0 days.

(21) Appl. No.: 09/380,412

(22) PCT Filed: Feb. 26, 1998

(86) PCT No.: PCT/DE98/00569

§ 371 (c)(1),
(2), (4) Date: Jan. 19, 2000

(87) PCT Pub. No.: WO98/38826

PCT Pub. Date: Sep. 3, 1998

(30) Foreign Application Priority Data

Feb. 28, 1997 (DE) ................................ 197 08 189

(51) Int. Cl.
*H04Q 7/20* (2006.01)
*H04M 3/42* (2006.01)

(52) U.S. Cl. ....................... 455/465; 455/415

(58) Field of Classification Search ............... 455/575, 455/465, 403, 415, 433, 74, 550, 551, 552, 455/554, 555, 558, 556, 557, 560, 411, 575.1, 455/550.1, 552.1, 411.1
See application file for complete search history.

(56) References Cited

U.S. PATENT DOCUMENTS

| | | | | |
|---|---|---|---|---|
| 5,617,467 A * | 4/1997 | Bacher et al. | ............... | 455/466 |
| 5,642,401 A * | 6/1997 | Yahagi | .................. | 455/411 |
| 5,748,621 A * | 5/1998 | Masuda et al. | ............. | 370/337 |
| 6,091,946 A * | 7/2000 | Ahvenainen | ................. | 455/411 |
| 6,092,133 A * | 7/2000 | Erola et al. | .................. | 710/102 |
| 6,128,509 A * | 10/2000 | Veijola et al. | .............. | 455/556 |
| 6,134,438 A * | 10/2000 | Sawyer | ......................... | 455/433 |
| 6,167,271 A * | 12/2000 | Parker et al. | ................ | 455/445 |
| 6,185,436 B1* | 2/2001 | Vu | ............................... | 455/558 |
| 6,332,076 B1* | 12/2001 | Shah et al. | .................. | 455/423 |
| 6,341,220 B1* | 1/2002 | Hurme | ......................... | 455/410 |
| 6,360,091 B1* | 3/2002 | Schellinger et al. | ......... | 455/403 |
| 2001/0046850 A1* | 11/2001 | Blanke et al. | .............. | 455/411 |

* cited by examiner

*Primary Examiner*—Melody Mehrpour
(74) *Attorney, Agent, or Firm*—Knobbe, Martens, Olson & Bear, LLP

(57) ABSTRACT

A cordless communication system includes a mobile terminal of a public mobile communication system and a base station. The base station is connectable to a public fixed network and compatible at an air interface with the mobile communication system which has at least one authentication function. A read and write unit of the base station reads and writes from and to, respectively, at least one identification module. Sections of data of the identification module used in the base station are identical to sections of data stored on a chip card of an access-authorized mobile terminal. The read data from the identification module is processed through software implemented in the base station. The mobile terminal is authenticated with regard to the base station through the processed data, wherein the base station fulfills the same functions and tasks as a home location register and, respectively, an authentication center of the mobile communication system. The mobile terminal is operated through the public fixed network if the authentication has been successful.

16 Claims, 2 Drawing Sheets

Physical Layout

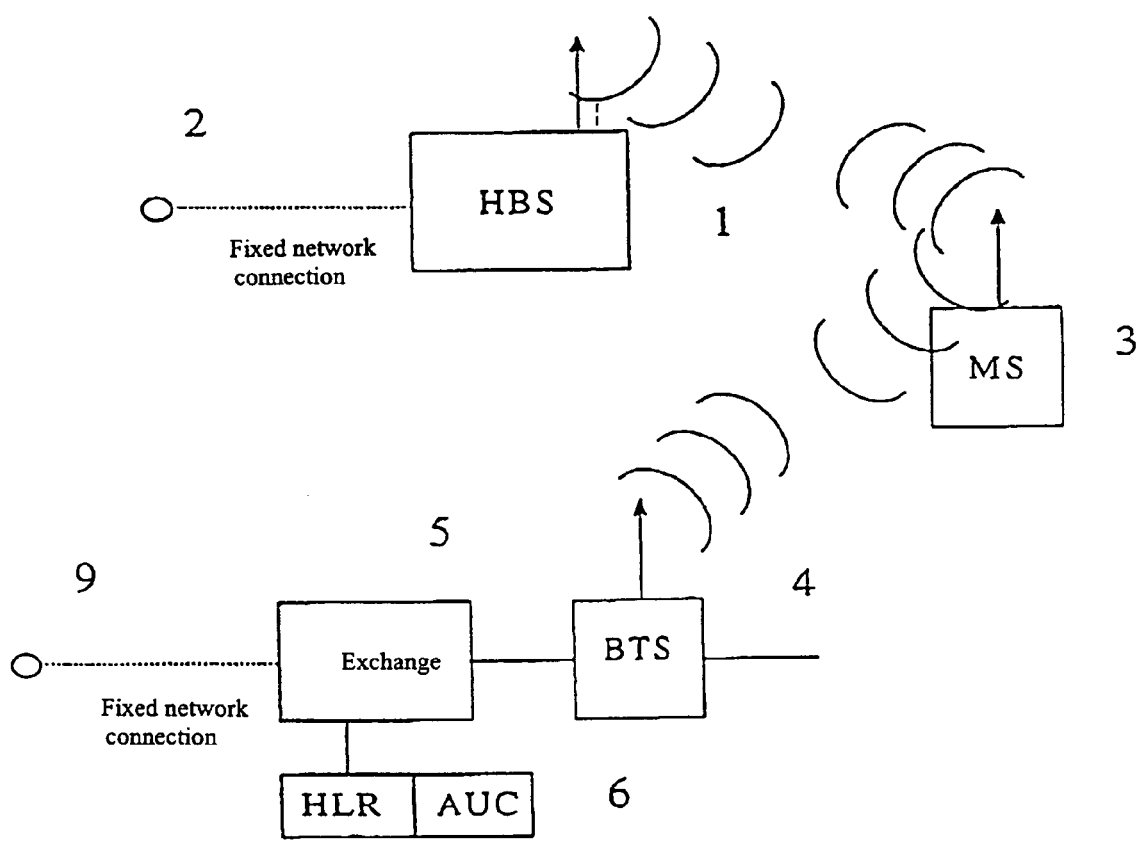
Figure 1. Physical Layout

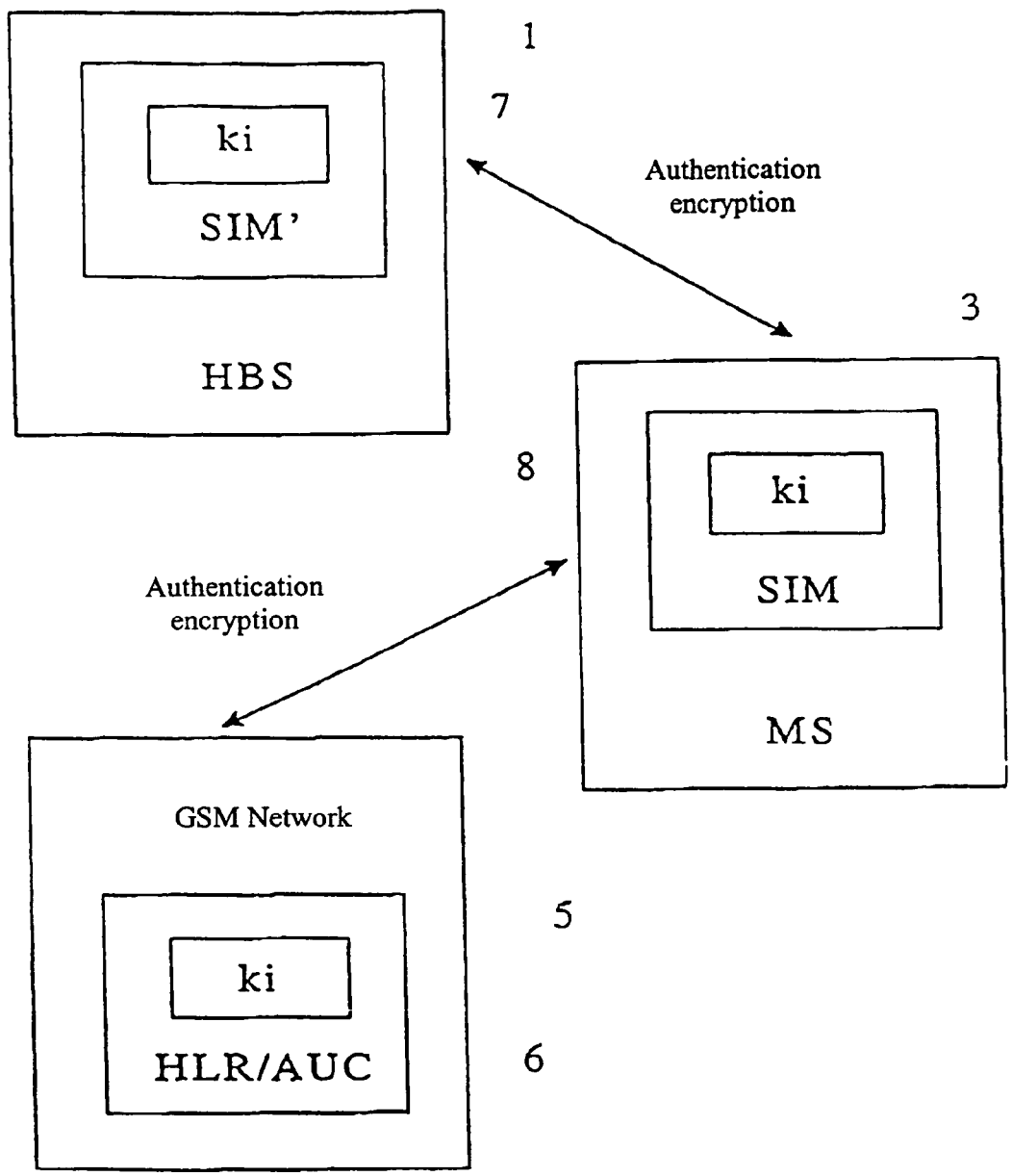
Figure 2. Logical Layout

PUBLIC MOBILE COMMUNICATION SYSTEM COMPATIBLE WIRELESS COMMUNICATION SYSTEM

FIELD OF THE INVENTION

The invention refers to a cordless communication system that is compatible with a public mobile communication system and a method of operating the cordless communication system.

BACKGROUND OF THE INVENTION

In today's mobile communication systems, a clear distinction exists between public mobile wireless systems, such as the GSM System and private cordless communication systems that operate according to, e.g., the in DECT standard [Digital European Cordless Telecomunication]. This has led to different system devices that can be used either for mobile wireless operation or for cordless operation.

Attempts have been made before to design terminals, in particular, mobile terminals, that can be used in two different mobile communication systems. However, due to the incompatibility of the different standards, relatively user-unfriendly and expensive solutions have resulted.

Another point of departure lies in arranging the base station of a cordless communication system in such a way as to make it compatible with a public mobile communication system, i.e., so that it can communicate with conventional mobile terminals. However, there is a lack of suitable suggestions for solving the problem of compliance with the required security functions. Herein the problem is that the base station of the cordless communication system is connected to a wire-bound fixed network, which makes it impossible to influence the base station via the mobile communication system.

SUMMARY OF THE INVENTION

WO-A-95124106 relates to a secured personal communication system based on a base station connected to the public network. The base station allows operation of mobile terminals of a mobile communication system. A conventional authentication method of the mobile communication system provides for the security of the communication, wherein the base station is connected to the security installations of the mobile communication system through the public fixed network and exchanges security information with the security features to allow registration of the mobile terminal at the base station. Hence, this method is based upon an exchange of the authentication sequences between the mobile terminal and the base station on one side, and between the base station and installations of the mobile communication system on the other side.

WO-A-95/02927 discloses a method of controlling transmit/receive devices of radio communication systems. The transmit/receive device is equipped with a device to read from a so-called Smart Card which stores information regarding frequencies that can be used by the transmit/receive device and that are permitted by the network carrier.

It is the task of the invention to suggest a cordless communication system with security functions that is compatible with a public mobile communication system and permits the use of suitable mobile terminals.

Another task is that the cordless communication system, despite the fact that it is a private system, should offer the possibility of being installed and operated under the control of the respective mobile communication network carrier.

In order to solve the posed task one aspect of the invention involves a method of operating a cordless communication system having a mobile terminal of a public mobile communication system and having a base station. The base station is connectable to a public fixed network and compatible at an air interface with the mobile communication system which has at least one authentication function. A read and write unit of the base station reads and writes from and to, respectively, at least one identification module. Sections of data of the identification module used in the base station are identical to sections of data stored on a chip card of an access-authorized mobile terminal. The read data from the identification module is processed through software implemented in the base station. The mobile terminal is authenticated with regard to the base station through the processed data, wherein the base station fulfills the same functions and tasks as a home location register and, respectively, an authentication center of the mobile communication system. The mobile terminal is operated through the public fixed network if the authentication has been successful.

The invention consists basically in that the base station of the cordless communication system is equipped with a suitable read/write device by means of which information can be read from or written to conventional identification modules, e.g., chip cards, SIMs [Subscriber Identity Modules], generally all active data carriers for information storage and processing. In combination with suitable software an the data stored in the identification module, the base station of the cordless communication system is now in a position to take over the functions of a base station of a mobile communication network with authentication functions, more precisely, the functions of an HLR (Home Location Register) and of an AUC (Authentication Center), respectively. This permits every authorized mobile terminal to log in with the base station of the cordless communication system and to communicate via the fixed network.

When used below, the term 'base station' if not otherwise indicated refers to the base station of the cordless communication system.

One of the many possibilities of the concept of the invention is described below using the example of a GSM mobile communication system. however, the invention is not limited to the GSM mobile communication system.

By installing in the base station of the cordless communication system one or more chip cards readers/writers and a common SIM chip card, the operation of the base station can function under the control of the GSM network carrier and security features for "GSM cordless operation" can be offered to the subscriber like those offered in GSM mobile broadcasting networks, such as the authentication and encryption of the call data. It is important that the chip card associated with the operation of the base station is issued solely by the network carrier, as is usually the case with GSM mobile terminals.

The chip card used in the base station together with suitable software installed in the base station takes over the functions of the Home Location Register (HLR), and of the Authentication Center (AUC), respectively, which means that the mobile terminal is authenticated only by the base station of the cordless system and not, as is usually the case, by the cellular network. A random number is generated by the software of the base station and, by means of $K_1$ keys that are identically stored in the chip card of the base station and in the chip card of the mobile terminal and that by means of the GSM system-specific A3 algorithm, it is transformed into an SRES response (authentication result). If the two authentication results—that of the base station and that of the mobile terminal—are identical, the authentication is successful. This authentication procedure is similar to that of the GSM system.

In known fashion, the $K_1$ key and the $A_8$ algorithm derive the key $K_c$ from the same random number; it serves for the encrypting of the communication at the wireless interface in cordless operation (as in the GSM system).

Aside from the usual user-specific data, additional data, e.g., allowed frequencies, the maximum allowable output power for the base station and for the mobile terminal, the permitted services (telephony, data transfer, fax etc.), and all other initialization parameters that the network carrier would like to influence and that the base station is allowed to use, can be stored in such a way that it is protected against manipulation on the SIM of the base station. This corresponds, at least for the services, to the known authentication administration in the Home Location Register (HLR) of a GSM cellular network.

By appropriate key management, it becomes feasible for several users, e.g., family members, to communicate through one and the same base station. For this purpose, as a first option, each subscriber who wishes to use the base station owns his own SIM card that can be inserted at the base station. Accordingly, the base station would require several card readers. As another option, data and keys for several subscribers can be stored on the SIM card of the base station.

Also, it is possible to use a group key in the base station that permits the authentication of several individual group members.

It is important that the chip card used in the base station contain the same core information as the chip card of the GSM mobile terminal that is to be operated with the base station. Only if the personal user information, in particular, the security functions, on both cards is identical, will the mobile terminal be in a position to be authenticated and to log into the base station.

Once the regular GSM-subscriber relationship is terminated, the authorization to communicate with the base station is canceled in the SIM card of the mobile terminal, preferably via the GSM wireless interface. This makes further useful operation of the base station on the frequencies that have been made available by the network carrier impossible since the mobile terminal cap no longer be authenticated by the base station.

A possible embodiment provides that the base station include a timer that is programmed to a certain time by the network carrier and that is reset automatically each time the base station is used by the subscriber. When the base station is not in use, e.g., after termination of the user relationship, the base station, after the programmed time period has passed, loses its authorization to operate the transmitter on the frequencies of the mobile communication system. If the base station is not used for an extended period of time, the function of the timer, through disconnection from the base station, can be frozen.

In the event that the subscriber, e.g., before leaving for an extended vacation, forgets to switch off the base station, and the base station automatically deactivates itself, an emergency restart possibility is provided within a defined time window.

In order to realize a GSM-compatible base station, it must first be equipped with a card reader for GSM-SIM cards. In addition, the base station must be capable of transmitting and receiving over standard GSM frequencies. The functions of the base station are controlled through suitable software, as is used, e.g., in GSM terminals, and carry out and control the usual GSM authentication and other functions.

BRIEF DESCRIPTION OF THE DRAWINGS

Only in minor software modifications are necessary in the mobile terminal.

FIG. 1 schematically shows an example of physical configuration of the system according to the invention;

FIG. 2 schematically shows an example of the logical configuration of the system according to invention.

DETAILED DESCRIPTION OF THE INVENTION

In FIG. 1 several components of a public mobile communication system are shown. There is a mobile terminal 3 that is located in the service area of a base station 4 of the mobile communication system, with which it can communicate in an encrypted mode via the wireless interface. The base station 4 of the mobile communication system is connected to an exchange 5 that has access to a public fixed network 9. The exchange 5 is also connected to the home location register (HLR) and the authentication center (AUC) of the cellular network. If the mobile terminal 3 wishes to log into the mobile communication network, authentication of the mobile terminal 3 is conducted in a known manner within the home location register, and respectively, the authentication center 6.

A base station 1 (HBS) of a cordless communication system is also shown that is connected to a public switched telephone network 2 (PSTN, ISDN). Due to the low-power output, the area covered by the base station is relatively small. Usually the base station 1 is located within one or more base stations 4 of a public mobile communication network.

As shown in FIG. 2, the mobile terminal 3 is authenticated for cellular operation via the cellular network with the aid of a specific identification key ($K_1$ key) that is stored, on the one hand, in the SIM card 8 of the mobile terminal 3 and, on the other hand, in the home location register 6 (HLR) and, respectively, in the authentication center (AUC) of the mobile communication system.

According to the invention, base station 1 of the cordless communication system is equipped with an identification module 7 (e.g., also with an SIM card) and with suitable software in order to fulfill, in connection with the data stored on the identification module 7, the same functions and tasks that are fulfilled by the home location register and, respectively, the authentication center of the mobile communication system, so that the mobile terminal 3, as long as it is located within the service are of the cordless communication system and has access authorization, can authenticate, log in, and communicate in an encrypted manner at the pertinent base station 1.

This is only possible if essential parts of the data of the identification module 7 that is used in the base station 1 are identical to the data stored on the chip card (SIM) of the access-authorized mobile terminal 3.

According to the invention, the base station 1 of the cordless system is now compatible with the mobile communication system, i.e., the base station 1 of the cordless system transmits periodically in standby mode a specific ID in order to indicate its presence and readiness for operation.

The mobile terminal 3 scans the frequency band for the specific ID of the base station 1. When the mobile terminal 3 enters the service area of the base station 1 and receives its ID without interference, the mobile terminal 3 attempts to log into the base station 1, as described above. For this purpose, as in the GSM system, authentication and initialization messages are exchanged between base station 1 and mobile terminal 3. If the authentication was successful, the mobile terminal 3 can communicate via the fixed network 2 without detour through the mobile communication network.

It is, of course, also possible for several authorized mobile terminals 3 to communicate with each other in an encrypted manner, without the participation of a public fixed network 2, 9 or of the mobile communication network, via the base station 1 of the cordless communication network.

What is claimed is:

1. A method of operating a cordless communication system comprising a mobile terminal of a public cellular communication system and having a base station which is connectable to a public fixed network and compatible at an air interface with the cellular communication system that has at least one authentication function, comprising:

reading and writing from and to, respectively, at least a first subscriber identity module through a read and write unit of the base station, wherein sections of data of the first subscriber identity module used in the base station are identical to sections of data stored on a second subscriber identity module of a mobile terminal authorized to access the public cellular communication system;

processing data read from the first subscriber identity module through software implemented in the base station, using a random number generated at the base station, so as to generate a first authentication result;

processing data read from the second subscriber identity module, using the random number generated at the base station, so as to generate a second authentication result;

authenticating the mobile terminal with regard to the base station through the first authentication result and the second authentication result, wherein the base station fulfills the same functions and tasks with respect to access control and authentication as a home location register and, respectively, an authentication center of the public cellular communication system, and wherein the authentication is performed without accessing a home location register in the public cellular communication system; and operating the mobile terminal through the public fixed network if the authentication has been successful.

2. The method of claim 1, further comprising blocking authorization of the mobile terminal through a network carrier of the public cellular communication system to log into the base station of the cordless communication system.

3. The method of claim 1, further comprising storing other data on the subscriber identity module in a tamper-proof manner, the other data including allowed frequencies, a maximum permitted output powers for the base station and the mobile terminal, allowed services, and initialization parameters which a network carrier desires to influence and which constitute a general framework for the operation of the base station of the cordless communication system.

4. The method of claim 1, further comprising operating the base station of the cordless communication system so that the air interface operates in a frequency spectrum of the public cellular communication system.

5. The method of claim 1, wherein the transmitted data is encrypted at the air interface.

6. The method of claim 1, further comprising programming a timer within the base station to a predetermined time by a network carrier, and automatically resetting the timer by a subscriber if an authorized use occurs, wherein the base station, if not used after the predetermined time has lapsed, loses authorization to operate a transmitter at frequencies assigned to the public cellular communication system.

7. The method of claim 6, further comprising restarting the base station if the base station is automatically shut off due to lapse of the predetermined time.

8. The method of claim 7, further comprising permitting said restarting of the base station only within a predefined time window.

9. A cordless communication system for the operation of a mobile terminal of a cellular communication system with a base station that is connected to a public fixed network and that is compatible at an air interface with the cellular communication system that has at least one authentication function, comprising:

a read/write unit within a base station, the read/write unit configured to read and write information from and to, respectively, at least a first subscriber identity module, wherein sections of data of the first subscriber identity module used in the base station are identical to sections of data on a second subscriber identity module of a mobile terminal authorized to access the cellular communication system; and software implemented in the base station for processing of data read from the first subscriber identity module and for authenticating the mobile terminal relative to the base station through the processed data based on the first subscriber identity module, wherein the base station fulfills the same functions and tasks with respect to access control and authentication as the home location register and, respectively, the authentication center of the cellular communication system, by using the processed data based on the first subscriber identity module and an authentication result generated by processing data read from the second subscriber identity module, and wherein the authentication is performed without accessing a home location register in the cellular communication system.

10. The cordless communication system of claim 9, wherein the first subscriber identity module is a chip card configured for a predetermined standard.

11. The cordless communication system of claim 10, wherein the predetermined standard is selected from the group consisting of ISO ID-1, ID-000, DCS 1800, and PCS 1900.

12. The cordless communication system of claim 9, wherein the second subscriber identity module is a chip card.

13. The method of claim 1, wherein the second subscriber identity module is a chip card.

14. A method of operating a cordless communication system comprising a mobile terminal of a public cellular communication system and having a base station which is connectable to a public fixed network and compatible at an air interface with the public cellular communication system that has at least one authentication function, comprising:

reading and writing from and to, respectively, at least a first identification module through a read and write unit of the base station, wherein a secret key is stored on the first identification module and a second identification module of a mobile terminal authorized to access the public cellular communication system;

generating a random number and generating a first authentication result based on the random number and the secret key using a ciphering algorithm at the base station;

generating a second authentication result based on the random number and the secret key using a ciphering algorithm at the access-authorized mobile terminal;

authenticating the mobile terminal with regard to the base station through the first and second authentication results such that the mobile terminal authenticates directly with the base station, wherein the base station fulfills the same functions and tasks with respect to access control and authentication as a home location register and, respectively, an authentication center of the public cellular communication system, and wherein the authentication is performed without accessing a home location register in the public cellular communication system; and operating the mobile terminal through the public fixed network if the authentication has been successful.

15. A method of operating a cordless communication system comprising a mobile terminal of a public cellular communication system and having a base station which is connectable to a public fixed network and compatible at an air interface with the public cellular communication system that has at least one authentication function, comprising:

transmitting a specific identification periodically from the base station to indicate presence and readiness for operation during a standby mode;

reading and writing from and to, respectively, at least a first identification module through a read and write unit of the base station, wherein sections of data of the first identification module used in the base station are identical to sections of data stored on a second identification module of a mobile terminal authorized to access the public cellular communication system;

processing data read from the first identification module through software implemented in the base station so as to generate a first authentication result;

processing data read from the second identification module so as to generate a second authentication result;

authenticating the mobile terminal with regard to the base station using the first and second authentication results, wherein the base station fulfills the same functions and tasks with respect to access control and authentication as a home location register and, respectively, an authentication center of the public cellular communication system, and wherein the authentication is performed without accessing a home location register in the public cellular communication system; and operating the mobile terminal through the public fixed network if the authentication has been successful.

16. A method of operating a cordless communication system comprising a mobile terminal of a public cellular communication system and having a base station which is connectable to a public fixed network and compatible at an air interface with the public cellular communication system that has at least one authentication function, comprising:

reading and writing from and to, respectively, at least a first subscriber identity module (SIM) card through a read and write unit of the base station, wherein sections of data of the first SIM card used in the base station are identical to sections of data stored on a second SIM card of a mobile terminal authorized to access the cellular communication system;

processing data read from the first SIM card through software implemented in the base station, using a random number generated at the base station, so as to generate a first authentication result;

processing data read from the second SIM card, using the random number generated at the base station, so as to generate a second authentication result;

authenticating the mobile terminal with regard to the base station through the first authentication result and the second authentication result, wherein the base station fulfills the same functions and tasks with respect to access control and authentication as a home location register and, respectively, an authentication center of the public cellular communication system; and operating the mobile terminal through the public fixed network if the authentication has been successful.

* * * * *

UNITED STATES PATENT AND TRADEMARK OFFICE
CERTIFICATE OF CORRECTION

| | | |
|---|---|---|
| PATENT NO. | : 7,248,886 B1 | Page 1 of 1 |
| APPLICATION NO. | : 09/380412 | |
| DATED | : July 24, 2007 | |
| INVENTOR(S) | : Ljungstroem et al. | |

It is certified that error appears in the above-identified patent and that said Letters Patent is hereby corrected as shown below:

Page 1, Column 1, Line 18, delete "Telecomunication]." and insert -- Telecommunication]. --, therefor.

Column 1, Line 32, delete "Herein" and insert -- Here, --, therefor.

Column 1, Line 40, delete "WO-A-95124106" and insert -- WO-A-95/24106 --, therefor.

Column 1, Line 48, delete "network" and insert -- network, --, therefor.

Page 2, Column 2, Lines 5-7, After "terminal of a public" delete "mobile communication system and having a base station. The base station is connectable to a public".

Page 3, Column 2, Line 44, delete "however," and insert -- However, --, therefor.

Page 4, Column 3, Line 46, Delete "cap" and insert -- can --, therefor.

Page 4, Column 3, Lines 55-59, delete "period has..................be frozen." and insert the same as the continuation of the paragraph on Line 53.

Signed and Sealed this

Eighteenth Day of March, 2008

JON W. DUDAS
*Director of the United States Patent and Trademark Office*